Figure 1:
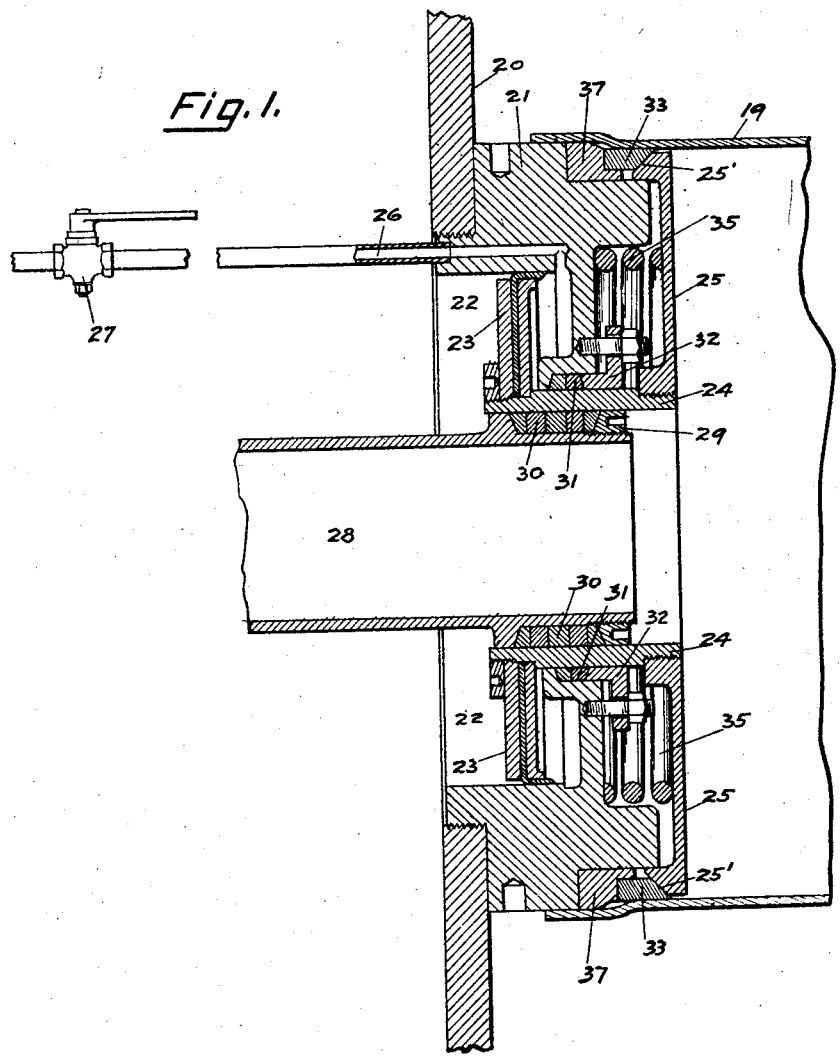

Nov. 1, 1927.

J. S. BEALL 1,647,121

PIPE-TESTING MACHINE

Filed Dec. 28, 1926

2 Sheets-Sheet 1

JOHN S. BEALL.
Inventor.

By G. F. McDougall

Attorney.

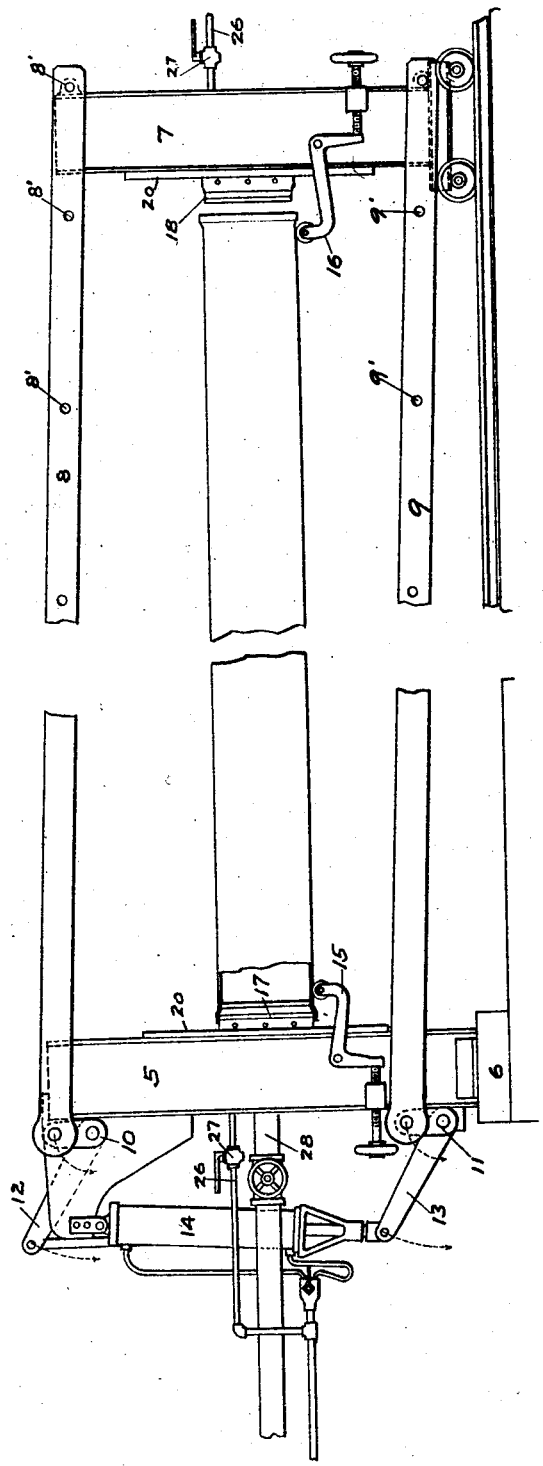

Patented Nov. 1, 1927.

1,647,121

UNITED STATES PATENT OFFICE.

JOHN S. BEALL, OF PORTLAND, OREGON.

PIPE-TESTING MACHINE.

Application filed December 28, 1926. Serial No. 157,470.

My invention relates to mechanisms for applying pressure tests to piping and cylinders in course of their construction and consists principally in adequate mechanisms for effecting the closure of open ends of pipe and cylinders of like character without any threading or welding or ordinary method of attaching closures. My invention consists essentially of two expansible heads for closing the ends of cylinders to be tested under hydraulic, compressed air, or similar test pressures, and means for holding these expansible heads in correct relation to a cylinder about to be tested, to retain the heads in place after being placed in the ends of the pipe to be tested, secure against any movement longitudinally of the pipe due to internal pressure.

In describing the mechanism reference is had to the accompanying drawings which illustrate a preferred application of my invention. Fig. I is a detail of an expansible head and Fig. II is an elevation showing the operation of two heads, the supporting mechanism and means for accomplishing the functions hereinafter described.

In Fig. II a fixed head, 5, is securely anchored to a suitable base, 6, and a movable head, 7, is mounted movably in such a manner that the longitudinal distance between the fixed head, 5, and the movable head, 7, may be adjusted at will within the limits fixed by the construction of the tie members, 8 and 9. The said tie members, 8 and 9, are provided with a plurality of steps, 8' and 9', whereby the movable head, 7, may be set at predetermined positions; and an additional movement is provided by the cams, 10 and 11, operated by the levers, 12 and 13, which are in turn operated upon by the pressure cylinder, 14.

In operation the pipe is placed upon the supporting elements, 15 and 16, and in alignment with the expansible heads, 17 and 18. The longitudinal closing movement of the movable head, 7, due to the movement afforded by means of the pressure cylinder, 14, will be sufficient to leave both of the expansible heads, 17 and 18, inserted within the ends of the pipe; the heads will then be expanded and completely close the ends of the pipe to be tested so that they are fluid tight and will not leak under the pressures within the scope of the testing apparatus.

The expansible heads, 17 and 18, are similarly constructed and independently operated in the applications that I have made of my new invention, but the means for expanding the heads may be piped from a pressure source to both heads so that they may be operated simultaneously if desired.

Referring to the detail in Fig. I, a pipe to be tested is represented by the broken section, 19. A backing plate member, 20, preferably circular in general outline, is securely attached to a head such as 5 or 7 and carries a head frame, 21, securely attached to its central portion. This head frame, 21, is bored out in its central portion to form a working cylinder, 22, which is occupied by an annular piston, 23, mounted upon a hollow piston rod, 24, which carries a plate member, 25, securely attached to its other end, and which is movable with the said piston, 23, and the hollow piston rod, 24, the whole being actuated by fluid pressure transmitted through the conduit, 26, controlled by the stop and waste cock, 27. The hollow piston rod, 24, is provided with a smooth cylindrical inner surface which acts as a cylinder surrounding the pressure pipe, 28, which is provided with a gland member, 29, and packing, 30, so that it is fluid tight within the bore of the hollow piston rod, 24. The pressure space behind the annular piston, 23, is made fluid tight by means of the packing, 31, and the packing gland, 32.

It will be apparent that when pressure through the conduit, 26, is admitted behind the annular piston, 23, that a longitudinal movement of the said annular piston, 23, its attached hollow piston rod, 24, and the plate member, 25, will be produced. The plate member, 25, having a beveled portion, 25' that acts against the expansible gasket member, 33, which is preferably made of rubber or a resilient composition having the character of rubber, tends to compress and expand the said expansible gasket member, 33, increasing its diameter and causing a closure of the pipe, 19, that will be completely leak proof. Pressure for testing may then be supplied by the pressure pipe, 28, to such a degree as is desirable.

In practical use only one of the expansible heads will ordinarily be supplied with the pressure pipe, 28, and while it is being filled with water preparatory to a hydraulic pressure test. After the testing has been completed, the stop and waste cock, 27, is moved to its discharge position whereupon the coil spring, 35, will cause a reaction of the plate member, 25, and all of its attached parts, which will allow the expansible gasket member, 33, to contract to its original dimensions, permitting the easy removal of the pipe, 19.

Ordinarily the outside diameter of the expansible gasket, 33, will be a major fraction of an inch less than the internal diameter of the pipe to be tested, to facilitate easy application and quick withdrawal of the work.

It will be noted that the essential feature of this device is the expansible gasket member, 33, and means for causing it to expand after being inserted within the pipe and backing for the said expansible gasket member so that it shall not be blown out of the pipe by internal pressure. Backing is shown to be provided by the removable ring member, 37, which with the expansible gasket member, 33, the plate member, 25, comprise all of the parts required to be changed when it is desired to test a larger sized pipe. The illustration in Fig. I shows the machine equipped with these devices for testing the smallest diameter pipe that it is capable of operating upon.

It will be evident to anyone skilled in the art to which this invention appertains that various substitutions may be made for the several parts described and different mechanical motions than the ones illustrated may be used to produce the same result and without substantial variation from the mechanical principles herein illustrated and specified.

I therefore do not limit myself to the exact construction shown, but what I claim is new and desire to secure by Letters Patent, is—

1. In a pipe testing machine, an expansible head for said machine comprising a head member for inserting within a pipe to be tested and having a resilient expansible gasket member with a bevelled inner surface and means for expanding said gasket member within a pipe to be tested comprising a movable expanding plate having a bevelled surface adapted to co-operate with the bevelled surface of said gasket member, cylinder and piston means for causing an appropriate motion of said movable expanding plate, and spring means for returning said expanding plate to its normal position when the cylinder and piston are inoperative.

2. In an expansible head for a pipe testing machine, a resilient expansible gasket member having a beveled internal surface and a co-operating expanding member having a beveled outer edge adapted to expand the said resilient expansible gasket within a pipe to be tested, an annular piston connected to said expanding member, a cylinder for said piston, conduit means for supplying fluid pressure to said piston within said cylinder and coil spring means for counteracting said piston.

3. In an expansible head for a pipe testing machine, a resilient expansible gasket member having a beveled internal surface and a fluid piston operated co-operating expanding member having a beveled edge adapted to expand the said resilient expansible gasket within a pipe to be tested.

4. In an expansible head for a pipe testing machine, a resilient expansible gasket member having a beveled inner surface, a backing plate for said gasket member, a circular movable expanding plate having a beveled external edge adapted to co-operate with and expand the said resilient expansible gasket member, fluid pressure means for producing expanding movement of said expanding plate and spring means for returning it to its original position.

5. In an expansible head for a pipe testing machine, a resilient expansible gasket member provided with a beveled inner surface, a backing plate for said gasket member, an expanding plate for said gasket member comprising a power operated expanding plate having a beveled external edge adapted to co-operate with the beveled inner surface of said gasket member and expand the same and spring means for normally retaining the said expanding plate in an inoperative position.

6. In a pipe testing machine for testing pipe having two open ends, a fixed head member carrying a power operated expansible head of the character described and a movable head member carrying a power operated expansible head of like character and means for inserting the said expansible heads and expanding them as described within a pipe to be tested and retaining them in said position immovably while the pipe is being tested.

7. In a pipe testing machine, a closing device comprising a head member for insertion in a pipe and having an expansible resilient gasket member, a backing plate for said gasket member, expanding means for said gasket member comprising a beveled expansion plate and fluid piston operated means for causing a movement of said beveled expansion plate whereby the said gasket is expanded to fluid tightness within the walls of the pipe to be tested.

8. In a pipe testing machine, a closing device comprising a head member for insertion in a pipe end having an expansible resilient gasket member, a backing plate for said gasket member, expanding means for said gasket member comprising a beveled expansion plate and power means for causing a movement of said beveled expansion plate whereby the said gasket is expanded to fluid tightness within the walls of the pipe to be tested.

9. In a pipe testing machine an expansible head member having a normally smaller diameter of its expansible portion than a pipe to be tested, a backing plate member larger in diameter than the pipe to be tested, a peripheral surface of said expansible portion comprising a resilient expansible gasket member having a beveled internal surface and expanding means for said resilient expansible gasket member comprising an expansion plate with a beveled external surface adapted to co-operate with said gasket member and expand the same, piston and cylinder means for forcing said expanding plate into said expansible gasket member and helical spring means for returning said expanding plate into its original position.

JOHN S. BEALL.